United States Patent [19]

Koch et al.

[11] Patent Number: 4,718,469
[45] Date of Patent: * Jan. 12, 1988

[54] PREFORMED PLUG-TIRE REPAIR

[75] Inventors: Russell W. Koch, Hartville, Ohio; Douglas D. Snyder, Tempe, Ariz.

[73] Assignee: The Firestone Tire & Rubber Company, Akron, Ohio

[*] Notice: The portion of the term of this patent subsequent to Oct. 21, 2003 has been disclaimed.

[21] Appl. No.: 872,313

[22] Filed: Jun. 9, 1986

Related U.S. Application Data

[63] Continuation-in-part of Ser. No. 718,666, Apr. 1, 1985, Pat. No. 4,618,519, and a continuation-in-part of Ser. No. 767,998, Apr. 21, 1985, abandoned, which is a continuation of Ser. No. 584,426, Feb. 28, 1984, abandoned, said Ser. No. 718,666, is a continuation-in-part of Ser. No. 584,426, Feb. 28, 1984, abandoned.

[51] Int. Cl.$^4$ .................. B60C 21/00; B32B 25/00
[52] U.S. Cl. ..................... 152/370; 156/97; 428/36; 428/63
[58] Field of Search ............... 428/36, 63; 152/370, 152/371, 367

[56] References Cited

U.S. PATENT DOCUMENTS

| | | | |
|---|---|---|---|
| 3,143,156 | 8/1964 | Fagert et al. | 152/370 |
| 3,644,256 | 2/1972 | Broisman | 156/335 |
| 3,718,587 | 2/1973 | Bhakuni et al. | 252/8.8 |
| 3,755,261 | 8/1973 | VanGulick | 528/ |
| 3,779,794 | 12/1973 | DeSantis | 156/329 |
| 3,834,934 | 9/1974 | Broisman et al. | 152/335 |
| 3,888,831 | 6/1975 | Kogon | 528/ |
| 3,966,530 | 6/1976 | Cutts et al. | 156/308 |
| 3,991,255 | 11/1976 | Blaskiewicz et al. | 427/302 |
| 4,085,283 | 4/1978 | Otter et al. | 544/214 |
| 4,125,522 | 11/1978 | Becker | 528/61 |
| 4,136,219 | 1/1979 | Odam et al. | 428/492 |
| 4,143,454 | 3/1979 | Utsunomiya et al. | 428/393.5 |
| 4,158,378 | 6/1979 | Pearson et al. | 427/421 |
| 4,240,852 | 12/1980 | Gomberg et al. | 156/96 |
| 4,300,970 | 11/1981 | Honda et al. | 156/244.11 |
| 4,311,181 | 1/1982 | Hausch | 152/353 |
| 4,327,138 | 4/1982 | Hausch | 428/36 |
| 4,352,704 | 10/1982 | Williams et al. | 156/125 |
| 4,399,852 | 8/1983 | Hausch | 152/353 |
| 4,434,832 | 3/1984 | Koch et al. | 152/370 |
| 4,435,456 | 3/1984 | Hausch | 428/36 |
| 4,465,535 | 8/1984 | Fieldhouse et al. | 152/97 |
| 4,485,135 | 11/1984 | Koch | 152/370 |
| 4,485,136 | 11/1984 | Koch | 428/36 |

FOREIGN PATENT DOCUMENTS 1352645 5/1974 United Kingdom .

OTHER PUBLICATIONS

Product No. PS-2682-71, Hughson Chemical Div. Lord Corp.
"Room Temperature Vulcanizing Adhesive Based on Ethylene-Propylene-Diene Terpolymer," by Canton, Uniroyal, Paper No. 18, Rubber Chemistry Div. of American Chemical Society, Denver, Colorado, Oct. 10, 1973.

Primary Examiner—Christopher Henderson
Attorney, Agent, or Firm—D. N. Hall

[57] ABSTRACT

A repaired elastomer article has a hollow in a non-reinforced portion of the article. A cured preformed plug resides within the hollow and is adhered to the article through an amine curable polymer or prepolymer. The amine polymer or prepolymer is curable at ambient temperature. The preformed plug is made of a material which is compatible with the elastomer of the article. The preformed plug material desirably has a lower modulus than the elastomer of the article and hence exhibits good physical properties such as enhanced longevity of the repair, good wear and the like. Since the amine curable polymer or prepolymer cures at ambient temperatures, the repair of the elastomer article can occur in situ. The invention is especially useful in the repair of tires.

18 Claims, 6 Drawing Figures

PREFORMED PLUG-TIRE REPAIR

CROSS-REFERENCE

The present invention is a continuation-in-part of U.S. application Ser. No. 718,666 filed Apr. 1, 1985, now U.S. Pat. No. 4,618,519, issued Oct. 21, 1986 for "Tire Repair By "Patch Only" Method", which in turn is a continuation-in-part of U.S. application Ser. No. 584,426, filed Feb. 28, 1984, now abandoned. This application is also a continuation-in-part application of U.S. Ser. No. 767,998 filed Apr. 21, 1985 which in turn is a continuation of U.S. application Ser. No. 584,426, filed Feb. 28, 1984 now abandoned.

TECHNICAL FIELD

The present invention relates to an article and to a method for the repair of elastomeric articles having a hollow therein such as a gouge, an opening or the like. More specifically, the present invention relates to the repair of said hollow through the use of a cured preformed plug and an amine curable polymer or prepolymer at ambient temperatures.

BACKGROUND ART

Heretofore, elastomer articles such as tires having a hollow therein have been repaired by adding a material to the hollow and curing the same in the presence of heat. Inasmuch as heat was required, proper equipment was necessary and hence the article had to be repaired in a retread or a repair facility.

U.S. Pat. Nos. 3,755,261 to VanGulick; 3,888,831 to Kogan; 3,834,934 to Broisman; 3,644,256 also to Broisman; and 3,718,587 to Bhakuni relate to amine curable curing agents, amine curable polymers, or R.F.L. type adhesives. However, these patents do not relate to the in situ repair of a reinforced elastomer article utilizing a cured preformed plug.

U.S. Pat. No. 3,779,794 to DeSantis relates to a moisture-curable polyurethane sealant primer system, whereas U.S. Pat. No. 4,085,283 to DenOtter relates to flame retardants utilized in cyanuric acid derivatives.

Product No. PS-2682-71 of the Hughson Chemical Division, Lord Corporation, relates to a surface primer for elastomeric substances utilizing a proprietary compound thought to be mono- or di-chloroisocyanuric acid.

An article entitled "Room Temperature Vulcanizing Adhesive Based on Ethylene-Propylene-Diene Terpolymer," Cantor, Uniroyal, Paper No. 18, presented to the Division of Rubber Chemistry of the American Chemical Society, Denver, Col. Oct. 10, 1973, relates to various oxidants which effect ambient temperature cures of E.P.D.M.

U.S. Pat. No. 4,136,219 to Odam relates to a polyurethane paint which is applied to vulcanized rubbers.

British Pat. No. 1,352,645 relates to a polyurethane paint which is applied to vulcanized rubbers.

U.S. Pat. No. 4,125,522 to Becker relates to a polyurethane adhesive.

U.S. Pat. No. 3,966,530 to Cutts relates to triazoline diones which are utilized in lieu of chlorinated or halogenated donors for treating elastomeric surfaces to improve adhesion.

U.S. Pat. No. 3,143,156 to Fagert relates to utilizing a non-fully cured plug to repair an aperture extending entirely through a tire.

U.S. Pat. No. 4,143,454 to Utsonomiya relates to a method of attaching connecting parts of an offshore structure wherein a liquid rubber is applied over a treating solution which can contain a halogen molecule.

U.S. Pat. No. 4,158,378 to Pearson relates to a cured rubber tire having a specific polyurethane therein and to a chlorine water treatment step.

U.S. Pat. No. 3,991,255 to Blaskjiewicz relates to the adhesion of a polyurethane to an EPDM surface utilizing various adhesives.

U.S. Pat. No. 4,300,970 to Honda relates to a method of bonding vulcanized rubber to resin.

U.S. Pat. No. 4,240,852 to Gomberg relates only to the use of a cyanoacrylate adhesive.

U.S. Pat. No. 4,352,704 to Williams relates to applying tire tread to a tire.

U.S. Pat. Nos. 4,327,138 and 4,399,852 to Hausch relate to a composition and process for applying and bonding a curable polymer or prepolymer at ambient temperature to the surface of a cured elastomer substrate.

U.S. Pat. Nos. 4,401,145 and 4,311,181 to Hausch relate to the application to an indicia.

U.S. Pat. Nos. 4,434,832 to Koch and Barbin, 4,485,135 to Koch, and 4,485,136 to Koch and Hausch relate to ambient temperature cure of elastomers having a hollow therein as well to the utilization of a patch.

U.S. Pat. Nos. 4,465,535 to Koch, Fieldhouse and Oziomek relates to the use of a specific solvent, 1,4-dichloroethane, utilized in connection with a treating agent.

U.S. Pat. No. 4,435,456 to Hausch relates to the process and composition for repairing a hollow at ambient temperature in the surface of a cured elastomer substrate.

U.S. Pat. No. 4,544,427 to Hausch relates to the use of a polyisocyanate as a layer in repairing an elastomer article.

DISCLOSURE OF THE INVENTION

It is therefore an aspect of the present invention to provide a repaired reinforced elastomer article in which a hollow contains a cured elastomer plug therein.

It is a further aspect of the present invention to provide a repaired reinforced elastomer article, as above, wherein the repair can be made in-situ and at ambient temperatures.

It is yet another aspect of the present invention to provide a repaired reinforced elastomer article, as above, wherein the elastomer plug is preformed and is made of a material compatible with said elastomer article.

It is yet another aspect of the present invention to provide a repaired reinforced elastomer article, as above, wherein the hollow exists in a non-reinforced area of the elastomer article and an amine curable polymer or prepolymer is utilized as an adhesive.

These and other aspects of the present invention will become apparent from the following specification.

In general, a repaired, reinforced elastomer article comprises the elastomer article, said article being cured and having a hollow therein, the treating agent, said treating agent coating said hollow; a cured elastomer plug, said cured elastomer plug residing within said hollow; a channel in said hollow, said channel existing between said plug and said article; an amine curable polymer or prepolymer, said amine curable polymer or prepolymer substantially filing said channel and, said amine curable polymer or prepolymer cured to said elastomer plug and to said article at ambient temperature.

PREFERRED EMBODIMENTS

Figure 1:
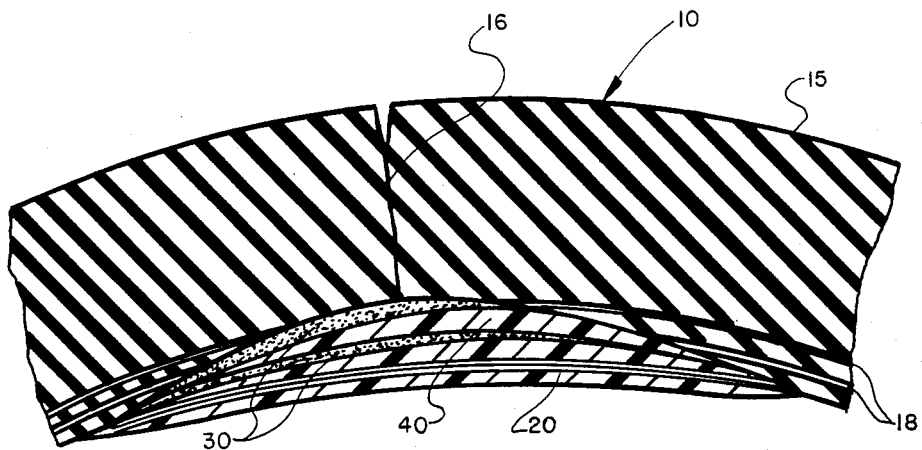
FIG. 1 is a cross sectional view showing the repair of a reinforced elastomer article having a crack/cut extending completely therethrough.

A reinforced elastomer article having a crack or cut therein, that is a crack/cut, is repaired by utilizing a cured elastomer patch preferably having cords therein. The patch is used to repair the crack/cut which generally extends through the elastomer article. The patch is generally applied on the non-initially cut or internal side of the article and the cut itself, if an opening exists, generally need not be filled. Portion 15 of the article is shown having a cut or crack therein. For the purposes of the present invention, the cut or crack (crack/cut) generally extends through the entire article such that it is in need of repair. Article 10, such as a tire, conveyor belt or the like, generally has reinforcement therein such as in the form of cords 18. When crack 16 extends through the article having a pressurized gas therein, such as a tire, the article will gradually lose pressure unless the loss of gas is stopped. The loss of air pressure in a tire naturally makes it unsuitable for use.

The crack/cut can be caused by a number of items such as nails, bolts, screws, metal objects, rocks, spikes, equipment, and the like. The invention is ideally suited for large off-the-road tires although it can also be applied to normal passenger car tires, truck tires, conveyor belts, and the like.

In order to repair the elastomer article, the interior side, or that side of the article opposite the initial cut penetration, is prepared for the application of the patch thereto. Such preparation generally includes removal of the tire innerliner layer as well as removal of one or more layers located immediately thereunder. Since usually the cords in the area of crack/cut are often damaged, they can be severed, outside of the damaged area, and removed. Oftentime portions of two or more of the tire cord plies are removed. The remaining exposed area is then buffed via any conventional apparatus or treatment. It is then cleaned utilizing conventional solvents such as acetone, rubber solvent, trichlorethane, and the like. Treating agent 30 is then applied to the cleaned area and allowed to dry. An amine curable polymer or prepolymer is then applied thereover. A cured patch 20 having a layer of treating agent 30 on one side thereof is then applied to the amine curable polymer or prepolymer layer 40. The thickness of the amine curable polymer or prepolymer 40 can vary but generally is between 1/6" to ⅛" thick and covers the area buffed out.

Upon cure, the repair obtained is usually equal to or stronger than the strength of the original article. Moreover, should the cut be large enough such that an opening exists on the exterior side, there is generally no need to fill said cut.

Another distinctive advantage of the present invention is that the amine curable polymer cures at ambient temperature. Thus, the repair can be made on the job site. That is, there is no need to take the tire or the article to the nearest retread shop or rubber repair shop which on some occasions can be hundreds of miles away.

Considering now the article to be repaired, or substrate 15, it is a cured rubber or elastomer, having unsaturated groups therein. The substrate can be any conventional elastomer or rubber known to those skilled in the art. For example, it can be made from conjugated dienes having from 4 to 12 carbon atoms such as butadiene, isoprene, and the like. It can also be made from natural rubber, that is from a substance which is obtained from various trees and plants which grow in the tropics or desert portions of the world. Such natural rubber generally has a content in excess of 90 and usually in excess of 95 percent of cis-1,4-polyisoprene. The substrate can also be made from various elastomeric copolymers such as those made from monomers of conjugated dienes having from 4 to 12 carbon atoms, as set forth above, and vinyl substituted aromatic compounds having from 8 to 15 carbon atoms. Examples of such vinyl substituted aromatic compounds include styrene, alpha-methylstyrene, and the like. An example of a specific copolymer is styrene-butadiene rubber.

Naturally, other types of rubber compounds can be utilized such as the so-called butyl rubbers, neoprene, that is polychloroprene, and the like, as well as blends of said above rubbers.

Suitable treating agents include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acid. A preferred treating composition for use in the practice of the present invention are the various mono-, di-, or trichloroisocyanuric acids, or combinations thereof. Trichloroisocyanuric acid is especially preferred.

The treating agents usually exist in solid form. They are readily soluble in solvents such as acetone and the like and thus can be applied in liquid form. Application of the treating agent generally occurs at ambient temperatures. Application can occur through any conventional manner as through brushing, spraying, and the like. The amount applied is such that the rubber substrate surface is coated. Preferably, two or more coats of the treating agent or adhesive compound are used to ensure that all the cured rubber substrate surface has been coated.

A typical amount of the treating agent in the suitable solvent, for example ethyl acetate or acetone, is generally from about 0.1 to about 10 percent by weight based upon the total weight of said treating agent and solvent, and preferably from about 0.5 percent to about 5 percent. Of course, higher or lower concentrations can be utilized. This solvent system has been found to dry within a matter of minutes so that the amine curable polymer or prepolymer can be bonded to the treating agent. It is thought that the adhesive treating system adds halogen groups, for example, chlorine to the cured rubber which activates the cured rubber surface allowing the amine curable polymer or prepolymer system to adhere strongly to the cured rubber surface.

Of the various amine curable polymers or prepolymers, the urethanes are preferred. Other prepolymers or polymers which can be cured with the amine curing agent include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212–221; halogen-containing hydrocarbon chlorinated polyethylene and polypropylene; chlorosulfonated polymers such as those described in the U.S. Pat. No. 2,723,257; polymers containing acid halide groups such as

and haloformate groups such as

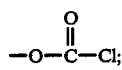

polymers containing anhydride groups which on reaction with diamines yield amide-acid linkages, and organa-polysiloxanes as described in U.S. Pat. No. 2,938,010.

The urethane prepolymers or polymers, that is, those which contain isocyanate groups, are generally formed by first reacting a polyether polyol or a polyester polyol with a molar excess of a diisocyanate to form a prepolymer having terminal isocyanate groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester-based coating polymer with approximately 2.4 percent isocyanate end groups, manufactured by American Cyanamid. Blends of these polyurethanes can also be utilized. Moreover, it has been found, particularly with repair or application of the amine curable polymer to the patch area, that is the area between patch 20 and cured substrate 11, better adhesion is often obtained by utilizing two different types of urethane. For example, a urethane containing a high amount by weight of isocyanate end groups such as Adiprene L-367 can be blended with a urethane containing a low amount by weight of isocyanate end groups such as Adiprene L-42. The amount of one urethane to the other can range from about 1 to about 99 percent and desirably from about 30 to about 70 percent by weight.

To the amine curable prepolymer or polymer compound is added a conventional amine curing agent, known to those skilled in the art. Generally, any conventional or known amine curing agent can be used and, hence, only a few specific examples will be given. Thus, the curing agent can be MOCA, that is 4,4'-methylene bis(2-chloroaniline) or, desirably a complex of 4,4'-methylene dianiline and a salt, or a complex of racemic 2,3-di-(4-aminophenyl) butane and a salt, as set forth in U.S. Pat. No. 3,755,261 to Van Gulick which is hereby fully incorporated by reference. The latter two complexes are preferred. The methods for preparing the complexes are set forth in U.S. Pat. No. 3,755,261. A preferred salt utilized with the 4,4'-methylene dianiline compound is sodium chloride or lithium chloride. Due generally to availability and cost, the complexes or salts derived from 4,4'-methylene dianiline are highly preferred. Another class of amine curing agents which can be utilized are the various Versamides, that is the condensation products of polyamines and dibasic acids obtained when certain unsaturated fatty acids are polymerized, and are manufactured by Henkel Chemical Company.

The equivalent weight of the curing agent utilized with regard to the curable prepolymer or polymer generally ranges from about 85 percent to 115 percent with from about 95 to 105 percent being preferred.

Often to facilitate processing, the curing agent, and especially an amine curing agent such as the complex of 4,4'-methylene dianiline and a salt is utilized with a plasticizer such as dioctylphthalate on a 50 percent weight basis, or Flexol 4GO, tetraethylene glycol bis(2-ethyl hexanoate) manufactured by Union Carbide Corporation on a 50 percent weight basis. The amount of plasticizer can range from about 20 percent to about 60 percent.

The curing agent is blended with the prepolymer or polymers in various mixers such as dough mixers, high speed impellers, paddle-type mixers, and the like. Small batches can be mixed by stirring with a spatula. Usually, the prepolymer or polymer is a liquid. If not, when mixed with the polar solvent, a liquid mixture results. However, even if a solid curing agent is used, when added to the prepolymer or the polymer, and to a solvent system, a liquid system results even though the curing agent (e.g., amine) can be in the form of a dispersion. Thus, even though the system may contain solids therein, the solids exist in the form of a dispersion so that a liquid system is produced.

The curing agent and the amine curable polymers or prepolymers form the curable polymer system which is mixed with a polar solvent so that a liquid system is obtained which cures at ambient or room temperature, that is, the prevailing temperature as from about 10° C. to 50° C. Often the ambient temperature will range from about 15° C. to about 35° C. or 40° C. The polar solvents which can be utilized, especially with the amine curing agent and the amine polymers or prepolymers are, for example set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred. The amount of curing agent, based upon said polymer or prepolymer, ranges from about 0.85 to about 1.15 equivalents.

Considering patch 20, it can generally be of any desired size so long as it adequately covers the surface area of the aperture. Generally, an appropriate patch size will be known to one skilled in the art of patch construction and/or patch application. The patch is made of rubber and is generally fully cured. Although cured natural rubber of composition containing at least 80 percent by weight of natural rubber is often preferred, any conventional type of cured rubber compound can be utilized. Thus, the patch can be made from a conjugated diene having from 4 to 12 carbon atoms, copolymers made from conjugated dienes having from 4 to 12 carbon atoms with vinyl substituted aromatics having from 8 to 15 carbon atoms, for example styrene butadiene rubber, and the like. In essence, the patch can be made out of the same type of rubber as the substrate. Often, the patch will have a cushioned layer thereon to alleviate stresses formed between the tire carcass and tire patch. However, this is not always necessary.

Since in the preferred embodiment of the present invention the substrate has cords therein, desirably the patch also has cords therein. More specifically, whenever approximately 25 percent to about 50 percent of the cords are damaged, severed, broken, etc., the strength of the cords in the patch is approximately equal to the strength of the total cords in the article before any injury thereto. However, should approximately 50 percent to 100 percent of all cords by damaged, severed, or otherwise injured, the strength of the cords in the patch is equal to the strength of the total cords in the article before injury thereto. Should the number of damaged cords in the article be less than approximately 25 percent, then, the strength of the remaining cords is usually adequate such that a reinforced patch need not be utilized. The cords in the patch can be made of polyester, nylon, steel, rayon and the like, with nylon being preferred.

The area around the cut or crack is buffed and cleaned as set forth above. Treating agent 30 is applied and then the amine curable polymer or prepolymer is applied. Treating agent 30 is also applied to one side of the patch. The ends of the patch can be taped to the substrate or held in place with a curing tube located inside the tire. The number of cords of the patch is as previously set forth. While the patch is held in place, the amide curable polymer or prepolymer cures at ambient temperatures.

In forming the amine curable polymer system, generally the amine curable polymer or prepolymer is mixed with the polar solvent and then the curing agent is added last. During cure, an effective and strong bond is formed between the prepolymer or polymer system and the treated elastomer substrate. Since the present invention relates to ambient temperature cure, repair of large and cumbersome articles such as off-the-road tires, conveyor belts, and the like, can be made in situ. In other words, the repair can be made at the job site. The only accessory which may be required is a pneumatic bladder, although a sand bag can be used. In extreme cold weather it is desirable to bring the damaged area of the tire, through the use of heating pads, up to ambient temperature. Since the cure is ambient, no steam chambers, or other vulcanizable tire repair equipment are required. This, of course, also results in an energy savings.

It is to be understood that various conventional additives in conventional amounts can be added to the amine curing agent and prepolymer systems such a colorants, softeners, fillers, antioxidants, plasticizers, and the like.

The invention will be better understood by reference to the following representative examples.

EXAMPLES

A tire which was determined to have an air leak was repaired in accordance with the present invention as follows:

The interior portion of the tire at which the air leak was determined was thoroughly buffed utilizing an OTR buffing tool. In this manner, the innerliner and the tiegum layer were removed down to the first body ply. Then, any damaged body cords were carefully removed. The buffed portion was then cleaned by vacuuming out the last traces of any buffing dust and the like. Next the buffed area was thoroughly cleaned with acetone on Rymplecoth. Generally, the area buffed and cleaned was about 12" to 24" to 12" to 24", then, a patch of a size set forth in the table was lightly buffed and cleaned in the same manner. The treating agent was applied in several coats as a 3 percent solution of trichloro-s-triazinetrione in ethyl acetate. This was allowed to dry. Then, the amine curable urethane system was applied which comprise the following two components: "A" side, 150 gm Adiprene L-367, 150 gm Adiprene 42, 30 gr 4GO and 30 gm of acetone; "B" side, 73 gm Caytur 21.

The thoroughly mixed polyurethane was then coated on to the buffed area of the tire and also to the reinforcing patch which was fully cured and contained no uncured layer. The patch containing the urethane thereon was applied to the buffed portion of the tire which has also previously been treated with the treating agent. The patch was taped into place and firmly held by inflating a curing tube inside the tire. After standing approximately 16–18 hours at an ambient temperature, tape was removed and the tire was placed back into service. The following results were obtained:

| TIRE NO. | TIRE SIZE | PATCH SIZE | ORIGINAL HOURS | REPAIR HOURS | RECENT STATUS |
|---|---|---|---|---|---|
| 1 | 36.00 × 51 | 12" × 12" | 2606 | 1587 | Worn Out |
| 2 | 36.00 × 51 | 12" × 12" | 2763 | 984 | Worn Out |
| 3 | 36.00 × 51 | 12" × 12" | 2068 | 1371 | Off, second rock cut in the tire |
| 4 | 36.00 × 51 | 12" × 12" | 671 | 1647 | Still in service |
| 5 | 36.00 × 51 | 15" × 15" | 2784 | 744 | Off, second rock cut in |

| TIRE NO. | TIRE SIZE | PATCH SIZE | ORIGINAL HOURS | REPAIR HOURS | RECENT STATUS |
|---|---|---|---|---|---|
| 6 | 36.00 × 51 | 18" × 18" | 1643 | 575 | the tire Off, patch failed |

As readily apparent from the Table, patches were quite effective in that in Tires #1 and #2, the tire actually wore out. The remaining tires are still in service or have obtained a second rock cut or the patch failed (not the adhesive). With regard to Tire #6, it is noted that the first repair failed because of a weak patch. However, upon replacement with a stronger patch, the performance of the repair improved.

From the above Table, it can been seen that a patch according to the present invention is very effective in repairing the tire as well as sealing air leaks therein.

According to another concept of the present invention, an elastomer article is repaired by making a cavity in the vicinity of the interior crack or cut. The cavity is then filled with a suitable filler and a patch applied thereover.

Figure 2:
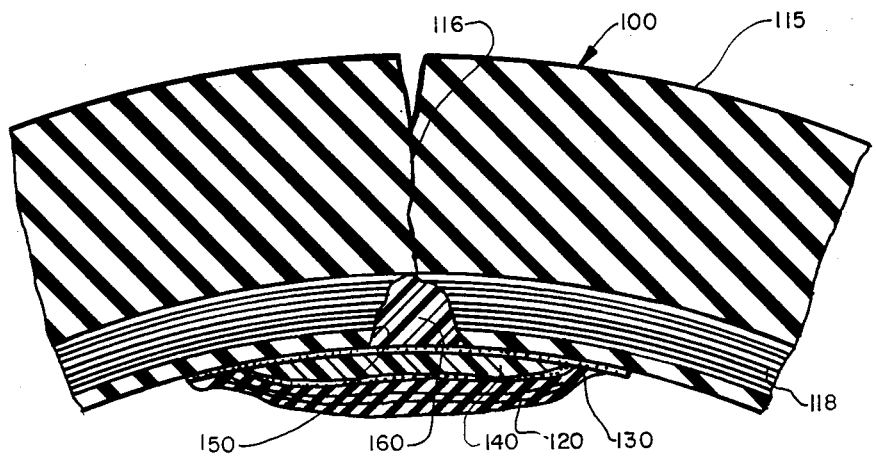
FIG. 2 is a cross sectional view of a reinforced elastomer having a filled cavity as well as a cured patch thereover on the interior side of the elastomer article.

Referring to FIG. 2, an elastomer article is generally disclosed by the numeral 100. The elastomer is generally made from a conjugated diene, or a copolymer made from a conjugated diene and a vinyl substituted aromatic as set forth hereinabove. The article can generally be any reinforced elastomeric article such as a tire, a conveyor belt or the like. The reinforcement is generally in the form of cords 118. A portion 115 of the article is shown having a crack or cut 116 extending therethrough and the repair structure and method of the present invention generally relates to such an article.

According to the present invention, a cavity 150 is made in the elastomer from the interior side thereof in the vicinity of or in the injured area. Although the area of the cavity generally is kept as small as possible, it is important that any injury or damaged area, and especially any damaged reinforcement cords, be removed. Inasmuch as the crack/cut extends through article 110, usually some of the cords and often most if not all of cords 118 will be damaged and hence should be removed in the injured area. Removal can be through the use of any suitable method such as skiving and the like. In skiving, generally a very sharp tool, for example having a tungsten carbide tip, is utilized. The depth of the cavity is usually into the reinforcement area and not beyond. Thus, for a tire, the cavity will extend through the inner liner, through the tiegum layer which bonds the inner liner to the reinforcement area, and into the reinforcement area wherein any damaged reinforcement cords have been removed. Once the cavity has been made, it is desirable to clean it out through a suitable means such as a solvent, for example acetone, or the like. Since cracks or cuts have a variety of sizes, the general diameter of the formed cavity will vary and in a tire can be from about ½" to about 3". The depth of the cavity in a tire such as in a large off-the-road tire can extend up to approximately 1½". Of course, these figures can vary greatly depending upon the size of the tire, or other elastomer article.

After cavity 150 has been cleaned, filler 160 can be added thereto. The filler can be any suitable material which generally has some elasticity therein. In other words, a material is preferred which has a modulus similiar to the elastomer article. Other requisites of filler 160 is that it adhere to the elastomer and also impart strength thereto. Examples of suitable fillers include gum rubber as set forth in U.S. Pat. No. 4,434,832, hereby fully incorporated by reference; various polymers such as amine curable polymers or prepolymers, amine curable compositions having rubber particles therein and the like. Inasmuch as various polymers must be cured at elevated temperature, although they can be utilized, they are not desired in the present invention. Desired polymers include the amine curable polymers and prepolymers inasmuch as they are curable at ambient temperatures. Examples of suitable amine curable polymers and prepolymers include those set forth hereinabove which are hereby fully incorporated by reference as well as the various amine curable polymers and prepolymers set forth in U.S. Pat. No. 4,485,135, also hereby fully incorporated by reference. A suitable amount of the polymer is added to fill the cavity. Although the crack or cut may be large enough such that an opening exists on the exterior side of article 100, there is generally no need to fill said opening.

Optionally and preferably, before filler 160 is added to cavity 150, a treating agent is applied or coated on the surfaces thereof when the filler is an amine curable polymer or prepolymer such as as a polyurethane. Otherwise, a treating agent is not desired. Treating agent 130 can be applied in any manner as by brushing or the like and usually is dissolved in a solvent. Upon drying, it forms a coating which forms a very strong bond to the amine curable filler 160. In other words, the use of treating agent 130 improves adhesion of the amine curable filler to the elastomer article. Suitale types of treating agents are as set forth hereinabove such as the various N-halohydantoins, the various N-haloamides, the various N-haloimides, and combinations thereof. Such treating agents are hereby fully incorporated by reference as well as are the various types and amounts of solvents utilized therewith. As noted above, the various mono-, di-, or trichloroisocyanuric acids, or combinations thereof are preferred.

Once a cavity has been filled with filler 160, cured patch 120 can be applied to the interior portion of the elastomer. However, the interior surface of the article surrounding the cavity is generally prepared as by cleaning, for example, by a mechanical means as by buffing, and/or with a solvent. Treating agent 130, if desirable, is then applied to the area surrounding the cavity and desirably to the filled cavity surface itself which generally is flush with the interior surface of the elastomer article. Treating agent 130 is the same type of agent as utilized to coat the inner surfaces of the cavity as immediately set forth above. The deposition of a layer of treating agent upon the interior surface is desired so that a good bond is formed between the article and the amine curable polymer of prepolymer. The treating agent is also applied to cured patch 120 which is also prepared as by buffing and cleaning with a solvent.

The patch is generally of any desired size so long as it adequately covers the cavity as well as extends a sufficient distance thereabout. Generally, an appropriate size patch will be well known to one skilled in the art of patch construction and/or patch application. The patch type as well as material and reinforcement therein is the same as set forth above and is hereby fully incorporated by reference. Essentially, the patch is made out of rubber and has cords therein. The number of the cords will generally vary with the number of cords in elastomer article 100 which have been damaged and/or removed. The strength of the cords within the patch is generally as set forth hereinabove with regard to FIG. 1. For example, should approximately 50 percent to 100 percent of all cords be severed or removed, the strength of the cords in the patch is generally equal to the strength of the total cords in the article before any injury thereto. Also as noted above, the cords in the patch can be made out of any suitable material such as polyester, nylon, steel, rayon, and the like with nylon being preferred.

The patch is then applied over the cavity area with the treating agent layer residing on said cleaned patch surface facing the cavity or interior portion of the elastomer. To form a good bond between the patch and the elastomer article, an amine curable polymer 140 is utilized. This amine curable polymer or prepolymer can be the same as utilized in the cavity and is also the same as material 40 noted above with regard to FIG. 1. That is, the amine curable polymer or prepolymer is generally a urethane polymer or prepolymer having a molecular weight when cured in excess of 10,000. Typical examples as previously noted can include the various polyurethanes manufactured by DuPont under the Adiprene trademark and the like.

To the amine curable polymer or prepolymer, either in the form of filler 160 or layer 140, is added a conventional amine curing agent known to those skilled in the art and hereby incorporated by reference including the amount used as well as any solvents, especially polar solvents. For example MOCA, methylene dianiline and a salt, or the like can be utilized. Should the filler be gum rubber or other polymers, conventional curatives can be utilized in conventional amounts, as is well known to the art.

Since the amine curable polymers or prepolymers as noted above are curable at ambient temperatures, that is from about 10° C., to about 50° C. and preferably from about 15° C. to about 35° or 40° C., the patch can be bonded to the elastomer article at ambient temperatures. In fact, when filler 160 is the desired amine curable polymer or prepolymer, it can also be cured at ambient temperatures.

The repair construction or method set forth immediately above with regard to FIG. 1 can be utilized on various items such as a tire. Generally, large tires such as off the road tires which have been cut or have a crack therein such that air is lost or are severely lacerated, require reinforcement. According to the present invention, such tires can be repaired on the job site, in situ and at ambient temperature. That is no heat or mold is required. Accordingly, the tire does not have to be taken to a nearby tire repair shop and thus less labor and time are required to repair the injury. The repair of the present invention has also been found to abate and stop crack or cut propagation or growth as well as stop rocks and other foreign materials from penetrating into the patch area.

The invention will be better understood by reference to the following example:

EXAMPLE I

The general preparation of the tire is as follows:

The center of the injury with regard to a large off the road tire is located. The innerliner and tiegum layer down to the first body ply as well as any other damaged body plies is removed. It is important to remove the damaged plies as well as the damaged area to prevent cut growth of the injury. Cut growth is defined as an increase in the size of the cut due to stress applied to the tire. To aid in removal of the damaged cords, a pencil rod tungsten-carbide tool can be used. The amount of non-damaged material removed is kept to a minimum. Next, the cavity created by removal of the damaged area including the body plies is buffed if possible. Desirably, the patch to be installed should also be buffed as is the area about the cavity. The size of the patch is larger than the cavity. The cavity is then cleaned to remove the last traces of the buffing dust as by vacuuming, brushing or the like. Next, a clean Rymplecloth with acetone thereon is used to thoroughly clean the buffed area. This procedure is repeated until only a faint gray coloration is observed on the Rymplecloth. The solvent cleaned area is then allowed to dry. A treating agent, as described above, is applied to the cavity, to the area about the cavity, to the patch, and permitted to dry. The treating agent can be applied in a few coats in a suitable solvent. After drying, an amine curable system is applied which comprises the two following compositions: The first composition contains 150 grams of Adiprene L-367, 150 grams of Adiprene 42, 30 grams of 4G0, and 30 grams of acetone. The second composition contains approximately 73 grams of Caytur 21. The two urethane compositions were then thoroughly mixed and applied to the cavity to an extent that it was essentially filled to the interior surface of the tire. The urethane system is also applied over the treated buffed area of the tire as well as of the patch. The patch was then applied to the tire over the cavity area, held in place by tape and a curing tube inside the tire, inflated, and allowed to dry at ambient temperature. After approximately 12-18 hours at ambient temperature, the tape was removed and the tire placed back into service.

In accordance with the above general procedure, the following tires were treated.

TABLE

| TIRE NO. | BRAND OF TIRE | PATCH SIZE | ORIGINAL HOURS | REPAIR HOURS | RECENT STATUS |
|---|---|---|---|---|---|
| 1 | 36.00 × 51 | 12" × 12" | 1653 | 5324 | Removed Ply Separation |
| 2 | 36.00 × 51 | 14" × 14" | 879 | 865 | Redo patch Failed |
| 3 | 36.00 × 51 | 14" 33 14" | 2784 | 744 | Second rock cut in tire |
| 4 | 36.0 × 51 | 18" × 18" | 1408 | 625 | Cut too large |
| 5 | 36.00 × 51 | 16" × 16" | 2769 | 931 | Second rock cut in tire |
| 6 | 36.00 × 51 | 12" × 12" | 1927 | 1123 | Running |
| 7 | 36.00 × 51 | 12" × 12" | 2271 | 1276 | Running |
| 8 | 36.00 × 51 | 14" dia. (Round Patch) | 2660 | 540 | Tread separation |

In all cases, the removal of the tire was not due to failure of the adhesive or tire repair procedure of the present invention. Moreover, it is noted that the procedure of the present invention gave a very surprising and unexpected result in that this procedure is opposite from standard tire repair practices. That is, it is steadfast and understood by the industry that the whole tire must be repaired in order to make a durable repair.

As apparent from the Table, it can be seen that a tire repair having an interior cavity as well as a patch thereover is very effective in repairing the tire as well as stopping air leaks therein.

A further aspect of the present invention relates to an elastomer article having a hollow therein. A preformed elastomer plug resides within the hollow and is adhered thereto. This aspect of a plug repair of an elastomer article is also applicable to the above crack/cut embodiments wherein the crack/cut portion is a hollow having a crack extending into a reinforced area.

The elastomer article, generally indicated by the number 200, can be any conventional elastomer or rubber known to art as well as to the literature and typically has unsaturated groups therein. Thus, it can be made from conjugated dienes having from 4 to 12 carbon atoms such as butadiene, isoprene and the like. Various other elastomers can be utilized as set forth hereinabove and such are accordingly fully incorporated by reference. Thus, styrene-butadiene rubber and the like can be utilized.

Figure 3:
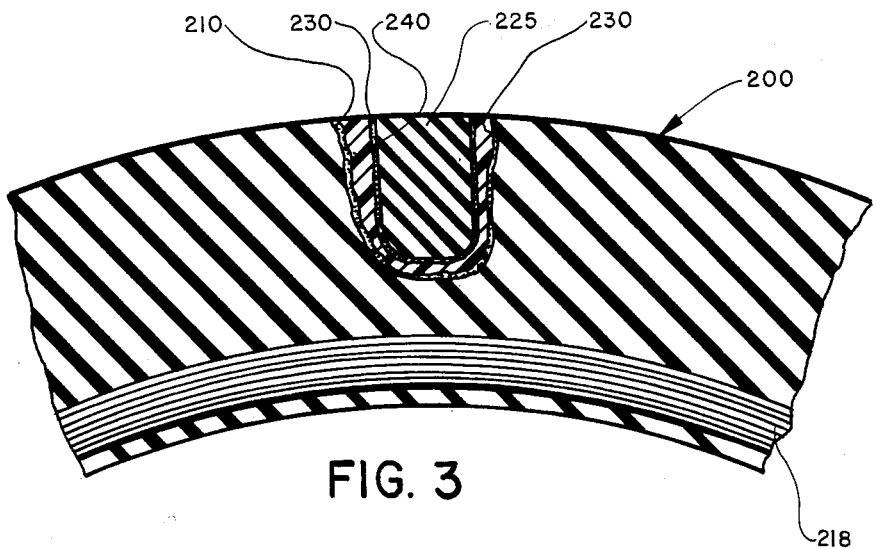
FIG. 3 is a cross sectional view of a reinforced elastomer article having a preformed plug in a hollow portion of the elastomer article.

Elastomer article 200 typically, but not necessarily, has reinforcement 218 therein as in the form of cords, belts or the like. According to the embodiment of FIG. 3, hollow 210 generally does not extend into any reinforcement area. In other words, hollow 210 generally resides within a "reinforcement free" portion of article 200. That is, the hollow generally resides solely within an elastomer portion of the article as shown in FIG. 3. Hollow 210 can be a gouge, a large cut, an opening and the like and thus forms an exterior cavity in the elastomer portion of the article.

The injured or hollow area is usually cleaned to remove all foreign debris, loose elastomer portions and the like. Cleaning can take place by any number of abrasive methods as by buffing out the injured hollow area making sure that all damaged portions are removed. The cleaning step can also be utilized to shape the hollow into a desirable size or shape such that it can receive plug 225 therein. In order to yield improved results, the hollow area or volume thereof is substantially filled by the plug. By substantially filled it is meant that at least 50 percent of the hollow volume, desirably at least 70 percent, more desirably at least 80 percent and preferrably at least 90 percent of the hollow volume is filled by plug 225. Plug 225 is a material which is compatible with the elastomer article. That is, it is generally a material which has the same or similar physical properties as the elastomer portion of the article as for example modulus, elongation, elasticity, tensile strength, wear rate and the like. It thus can be obtained from a similar article.

It is an important aspect of the present invention that plug 220 be previously cured before insertion into hollow 210 and that it be preformed. Since tires, e.g. sidewall areas and tread portions, conveyor belts and the like are already cured, they form a very suitable preformed plug source. Moreover, since they are obtained from a spent or used article, they are very economical. Generally and desirably, the preformed plug is a soft rubber. That is, it has been found that rubber plugs generally having a lower modulus than the article are a good plug material and extend the life of the repair. Any suitable material can be utilized such as a plug taken from another tire, for example an old tire, or one which is tailor made from synthetic materials. By lower modulus it is meant that the hardness of the rubber plug is usually less, although it can be higher, that is harder, than the hardness of the repair area, for example, a tire tread. Preferably, the modulus is lower than the repaired elastomer. In terms of Shore A hardness, the preformed plug has a hardness of from about 52 to about 85 and desirably from about 55 to about 65. Inasmuch as plug 225 is compatible with the elastomer article, it is generally of the same type of material as the elastomer as set forth herein above and hence is hereby fully incorporated by reference. Thus, plug 225 can be an elastomer made from conjugated dienes having from 4 to 12 carbon atoms, natural rubber, copolymers of vinyl substituted aromatic compounds having from 8 to 12 carbon atoms and conjugated dienes having from 4 to 12 carbon atoms, and the like. Examples of plug materials include polybutadiene, both synthetic and natural, polyisoprene, polypentadiene, nitrile polymers or copolymers with butadiene or styrene, styrene-butadiene rubber, various derivatives of styrene-butadiene rubber, and the like.

Various conventional curing agents in conventional amounts can be utilized to cure the rubber materials to form the preformed plug should it not already be cured. Such type of rubber polymers as well as curing agents are well known to the art as well as to the literature. Naturally, the preformed plugs can contain various additives therein such as fillers, reinforcement agents such as carbon black, antioxidants, antiozonates, and the like, all as known to the art and to the literature. Plug 225 can thus contain various conventional additives in conventional amounts as utilized in a tire sidewall stock, a conveyor belt, and the like. The plug can be made in different lengths and widths by curing the various types of rubber required in a mold and then cutting or shaping the same into a desired final size as by buffing utilizing conventional equipment.

Regardless of the particular material utilized to form the preformed plug, the plug is generally more pliable and durable than the repaired elastomer and thus has been found to be generally retained in the hollow for a much longer period of time than a non-elastomer plug. For this reason, various urethanes as well as amine curable polymers or prepolymers as described hereinabove, are generally not desired as a plug material.

Once a suitable, compatible elastomer plug source is obtained, it is cut by any conventional method such as skiving to a shape and size which substantially fills hollow 210. Foreign debris, loose particles, etc. are removed according to any conventional cleaning method such as through buffing, and the like. Next, both the interior portion of the hollow and the exterior portion of the plug are usually washed with a solvent. The solvent can be any conventional solvent including organic solvents known to the art and to the literature. Suitable organic solvents include acetone, ethyl acetate, and the like.

The use and application of a treating agent 230, an amine curable polymer or prepolymer 240 containing a curing agent, etc., therein is generally as set forth hereinabove and hence will only be briefly discussed with the above discussion being hereby fully incorporated by reference. Treating agent 230 is thus applied to the hollow as well as to the plug to form a coating thereon. Suitable treating agents include the various N-halohydantoins, the various N-haloamides, the various N-haloimides, and combinations thereof, as set forth herein above and hereby fully incorporated by reference. Preferred treating agents 230 include the various mono-, di-, or trichloroisocyanuric acids, or combinations thereof. Trichloroisocyanuric acid is especially preferred. As noted above, since the treating agents usually exists in solid form, but are readily soluble in organic solvents such as acetone and the like, they are generally disolved therein and applied in a solution. Application of the treating agent generally occurs at ambient temperature and can be applied in any conventional manner as through brushing, spraying and the like. Preferrably, two or more coats of the treating agents are applied to ensure that all the desired surfaces are coated. The amount of solvent which is utilized is set forth hereinabove.

Once a treating agent has been applied and dried at ambient temperature, various amine curable polymers or prepolymers are applied to the interior portion of hollow 200 as well as to exterior portion of plug 225. The various amine polymers or prepolymers which act as an adhesive and bond the plug to the treated elastomer article are set forth hereinabove and accordingly are hereby fully incorporated by reference. Desirably, such polymers or prepolymers are urethane. The amine curable polymers or prepolymers generally contain conventional or known amine curing agents therein such as MOCA, a complex of 4,4′-methylenedianiline and a salt, and the like. The equivalent weight of the curing agent utilized generally ranges from about 85 percent to about 115 percent with from about 95 percent to 105 percent being preferred based upon the weight of the amine curable polymer or prepolymer. As also noted above, various plastimizers can be utilized with the curing agent. The polymer or prepolymer component is generally mixed with a polar solvent so that a liquid system is obtained and can be readily applied to plug 225 as well as to hollow 200. The amount and type of polar solvents are set forth hereinabove and are accordingly fully incorporated by reference.

Once plug 225 as well as the interior portion of hollow 210 are coated with the mixture containing the amine curable polymer or prepolymer, the plug is inserted into the hollow. Naturally the amount of amine curable polymer or prepolymer 240 is sufficient such that once plug 225 has been inserted therein, substantially and preferably all of the openings or channels between the plug and the elastomer article are filled. The size and shape of plug 225 is furthermore such that upon insertion into the hollow, the top surface of the plug is desirably flush with the top or exterior surface of article 200.

Inasmuch as the amine curable polymer or prepolymer mixture is curable at ambient temperature, a strong bond will be formed between treating agent layer 230 and elastomer plug 225. By the term ambient it is meant any temperature at which the repair is made. Since the repair can be made in-situ, it will generally be made outdoors and hence is at the temperature of the surrounding air. Inasmuch as very low temperatures require too long of a cure time, they are not desired. An ambient temperature is accordingly from about 10° C. to about 50° C. with a preferred temperature range being from about 15° C. to about 30° C. The repair of the hollow according to the present embodiment of the invention in occuring at ambient temperature is highly convenient as well as easy and simple to conduct. Should the elastomer article be a large off-the-road tire, the need to take the tire to a tire retread or repair shop is eliminated. In many situations, the tire can be repaired on the rim with the tire rotated such that the hollow is located in the upper most portion or top position. The repair is very economical in that it is made in-situ. Since a non-urethane or a non-amine polymer or prepolymer compound is utilized as the plug, improved properties are obtained such as increased durability.

Figure 4:
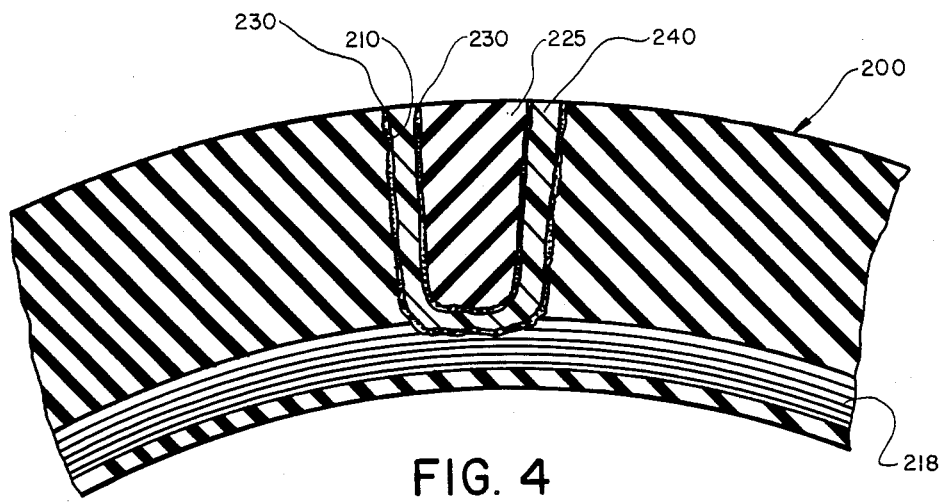
FIG. 4 is a cross sectional view of a reinforced elastomer article having a preformed plug in a hollow portion of the elastomer article wherein the preformed plug extends into the reinforcement area.
Figure 5:
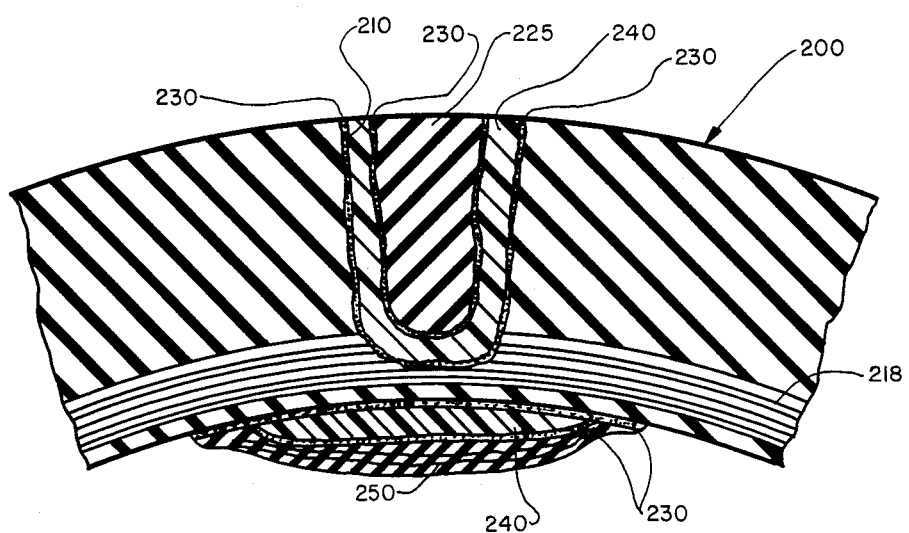
FIG. 5 is a cross sectional view of a reinforced elastomer article having a preformed plug in a hollow portion of the elastomer article wherein the preformed plug extends substantially into the reinforcement area and a patch located on the interior portion of the article.

According to the concepts of the present invention, preformed plug 225 can be applied to various size hollows. For example, in the embodiment shown in FIG. 3, the cured plug is applied to a hollow which partially extends into the reinforcement free portion of the article. That is, it does not extend into the cords of the reinforced article. In the embodiment of FIG. 4, hollow 210 partially extends into the reinforcement area 218. The remaining structure, layers, etc. are otherwise the same as in the embodiment of FIG. 2 and hence will not be repeated but rather is hereby fully incorporated by reference. Thus, the embodiment of FIG. 4 will contain a plug 225, a treating agent layer 230 thereon, an amine curable polymer or polymer layer 240, and another treating agent layer 230 coating the inside of the hollow. Generally, when the hollow extends into approximately 25% or less of the reinforcement area, an internal patch as utilized above with regard to the embodiments of FIGS. 1 and 2, is not necessary. By the term 25% of the reinforcement area, it is meant that the hollow has severed less than 25% of the total number of reinforcing cords in the hollow area. However, when the hollow generally extends in excess of 25% into the reinforcement area, a patch 250 is added to the interior portion of the article in the vicinity of the hollow. In this embodiment, that is FIG. 5, the hollow has severed generally greater than 25% of the existing cords. Accordingly, preformed plug 225 is applied in the manner as set forth above. That is, the hollow is cleaned as by skiving, buffing or the like. An appropriate treating agent 230 is applied to the walls of the hollow. Preformed elastomer plug 225 coated with treating agent 230 is then applied to the hollow and adhered to article 200 through the use of an ambient temperature cure amine polymer or prepolymer which fills the opening or channels between the plug and the article. In order to strengthen the article, an interior patch 250 is also applied. To ensure good adhesion of patch 250 to article 200, treating agent 230 is applied to the interior surface of the article in the vicinity of the hollow. Treating agent 230 is also applied to one side of patch 250. The amine curable polymer or prepolymer 240 is then applied to the treating agent residing on the interior portion of the article and to the treated side of patch 250. The patch is then applied to the interior portion of the article. Cure occurs at ambient temperature. As noted above, patch 250 has reinforcing cords therein. The strength of patch 250 to the interior portion of the article is generally at least equivalent to the strength of the severed cords and desirably stronger than the severed cords. The application of patch 250 to the interior portion of the article is generally the same as set forth hereinabove with regard to FIGS. 1 and 2 and accordingly the description thereof is hereby fully incorporated by reference including preparation of the interior surface as by buffing, and the like.

Figure 6:
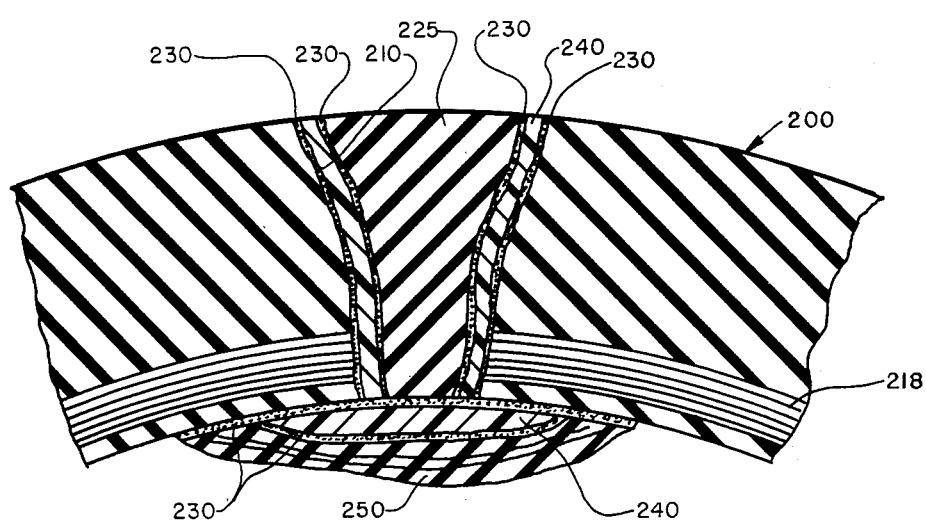
FIG. 6 is a cross sectional view of a reinforced elastomer article having a preformed plug in a hollow portion of the elastomer article wherein the hollow extends through the article and a patch is located on the interior portion of the article.

In the event that hollow 210 extends entirely through the reinforced article as in FIG. 6, the preformed plug 225 applied thereto can also extend through the entire article. The application of the plug in embodiment 6 as is set forth hereinabove. By way of a brief summary, the hollow is cleaned as described above, and treated agent 230 applied thereto. A preformed plug 225 is then sized, buffed, cleaned, coated with treating agent 230, coated with an amine curable polymer or prepolymer, and inserted into the treated hollow. Additional amine curable polymer or prepolymer 240 is then inserted into the opening about plug 225 as needed and allowed to cure at ambient temperature. Once again, the result is a soft pliable plug which has good adhesion to article 200. Since hollow 210 extends entirely through article 200, a patch 250 is utilized in the interior portion of the article. The application of the patch and various components thereof is as set forth above with regard to FIG. 5 and hence will not be repeated. The strength of patch 250 which has reinforcing cords therein is desirably at least equal to the strength of severed cords 218 and desirably is stronger. Alternatively, the patch can be applied in a conventional manner, that is, not utilizing treating agent 230 or the amine curable polymer or prepolymer 240 of the present invention.

Regardless of the method of repair, that is whether or not the injury extends into the reinforcement area, the important aspect of the present invention is the utilization of a cured preformed plug of a size and shape substantially conforming to the configuration of the hollow. Inasmuch as a compatible material is utilized, increased durability is generally obtained. Moreover, as apparent from the drawings, plug 225 is generally wider at the top than at the bottom. This is because most article gouges or openings (hollows) have a larger opening at the exterior portion of the article than at the interior portion. The preformed, solid plug is thus generally tapered inward toward the interior portion of the article.

The invention will be better understood by reference to the following example.

EXAMPLE II

A 36.00×51 Super Rock Grip Deep Tread tire (Firestone) having an 8" long and 2"-3" deep cut in the center of the tire tread at about a 5 degree angle to the circumference was utilized. The tire was in service on a 170 ton dump truck. At the time of the repair the tire was in use 2,493 hours. Typically tire life at the same location, a mine in Montana, was about 10,000 hours. The ply rating of the injured tire was 50 plys. The injury was buffed out using a 4" cone rasp. Sixteen grit surface with care being taken so that all damaged areas were removed, that is traces of the cut. The hollow after buffing was 9" long, 3" deep and about ⅞" in width. The hollow did not extend into the ply layer. A plug was made by cutting a piece from the sidewall of a scrap tire. The shape of the plug was approximately 8" long, 2¼" deep, ⅞" in width at the top tappering to approximately ¼" in width at the bottom. The rubber plug which contained no reinforcement therein was buffed. The tire hollow and the rubber plug were then throughly washed with acetone. The surfaces were allowed to thoroughly dry and then 3 coats of a 3 percent solution of trichloro-s-triazinetrione were brushed on to all of the buffed and washed surfaces of the tire hollow and the plug and allowed to dry. A 50/50 polyurethane bonding mixture consisting of 150 gm of Adiprene L-367 (approximately 6.5% NCO), 150 gm of Adiprene L-42 (approximately 4.2% NCO), 30 gm of 4GO and 30 gm of acetone mixed with 73 gm of Caytur 21 was made and coated onto the surface of the rubber plug and then were also coated. The plug was then inserted into the cavity. The plug was held in place by use of duct tape. A heating pad was used to maintain the temperature at ambient conditions, i.e. less than 110° F., and to facilitate an even cure rate. The repair was allowed to cure 16-18 hours in this manner. After the required cure time, the damaged area was repaired. The tire was placed back into service and the repair was still in good shape, after the tire had run 1188 hours. The tire is still running.

While in accordance with the patent statutes, a preferred embodiment and best mode have been set forth, various modifications thereof can be made without the parting from the scope of the present invention. Accordingly, the breath of the present invention is measured by the scope of the attached claims.

What is claimed is:

1. A repaired elastomer article; comprising:
   the elastomer article, said article being cured and having a hollow therein, a treating agent, said treating agent coating said hollow;
   a cured and preshaped elastomer plug, said cured and preshaped elastomer plug being free from an amine curable polymer or prepolymer and residing within said hollow;
   a channel in said hollow, said channel existing between said plug and said article;
   an amine curable polymer or prepolymer, said amine curable polymer or prepolymer substantially filling said channel; and,
   said amine curable polymer or prepolymer cured to said elastomer plug and to said article at ambient temperature.

2. A repaired elastomer article according to claim 1, wherein said elastomer article contains reinforcement therein, wherein said treating agent is selected from the group consisting of an N-halohydantoin, an N-haloamide, an N-haloimide, and combinations thereof, and wherein said ambient temperature range is from about 10° C. to about 50° C.

3. A repaired elastomer article accordingly to claim 2, wherein the volume of said plug is at least 50 percent of the volume of said hollow, wherein said plug has a shore A hardness of from about 52 to about 85, and wherein said amine curable polymer or prepolymer is selected from the group consisting of an epoxy resin, a halogen-containing hydrocarbon polymer, a chlorosulfonated polymer, a polymer containing an acid halide group such as

or haloformate group such as

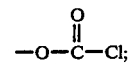

a polymer containing anhydride groups which on reaction with a diamine, yield an amide-acid linkage, an organopolysiloxane, a urethane polymer or prepolymer, and combinations thereof.

4. A repaired elastomer article according to claim 3, wherein said plug contains a coating of said treating agent thereon, and wherein said treating agent is selected from the group consisting of 1,3-dichloro-5-5-dimethyl hydantoin; 1,3-dichloro-5-isobutyl hydantoin; 1,3-dichloro-5-methyl-5-hexyl hydantoin; N-bromoacetamide; tetrachloroglycoluril; N-bromosuccinimide, and mono-, di-, or trichloroisocyanuric acid.

5. A repaired elastomer article according to claim 4, wherein said plug is at least 70 percent by volume of said hollow volume, wherein said treating agent is selected from the group consisting of monochloroisocyanuric acid, dichloroisocyanuric acid, trichloroisocyanuric acid, and combinations thereof, and wherein said amine curable polymer or prepolymer is an urethane polymer or prepolymer.

6. A reinforced elastomer article according to claim 5, wherein said elastomer plug has a Shore A hardness of from about 55 to about 65.

7. A tire having an exterior surface repair therein of the composition of claim 1 wherein said hollow exists in a reinforcement free portion of a tire.

8. A tire having an exterior surface repair therein of the composition of claim 5 wherein said hollow exists in a reinforcement free portion of a tire.

9. A tire having an exterior surface repair therein of the composition of claim 1 wherein said hollow extends into a reinforcement portion of a tire and wherein a cured elastomer patch exists on the interior portion of said tire in the vicinity of said hollow.

10. A tire having an exterior surface repair therein of the composition of claim 5 wherein said hollow extends into a reinforcement portion of a tire and wherein a cured elastomer patch exists on the interior portion of said tire in the vicinity of said hollow.

11. A repaired elastomer article; comprising:
the elastomer article, said elastomer article having a hollow therein, said hollow residing in an elastomer portion of said article;
a cured preformed plug, said preformed plug comprising a compatible material with said elastomer article, said cured preformed plug being free from an amine curable polymer or prepolymer and substantially filling said hollow:
a channel in said hollow, said channel formed between said plug and said article,
a treating agent, said treating agent coating at least said hollow;
an amine curable polymer or prepolymer, said amine curable polymer or prepolymer residing in said channel and bonding said plug to said article at ambient temperature.

12. A repaired elastomer article according to claim 11, wherein the volume said preformed cured plug is at least 50 percent of the volume of said hollow, and wherein said plug has a coating of said treating agent thereon.

13. A repaired elastomer article article according to claim 12, wherein said treating agent is selected from the group consisting of a N-haloimide, a N-halohydantoin, a N-haloamide, and combinations thereof, and wherein said amine curable polymer or prepolymer is selected from the group consisting of an epoxy resin, a halogen-containing hydrocarbon polymer, a chlorosulfonated polymer, a polymer containing an acid halide group such as

or haloformate group such as

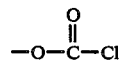

a polymer containing anhydride groups which in reaction with diamine yield an amide-acid linkage, an organopolysiloxane, a urethane polymer or prepolymer, and combinations thereof.

14. A repaired elastomer article according to claim 13, wherein said elastomer article contains reinforcement therein, wherein said ambient bond temperature is from about 10° to about 50° C., and wherein said treating agent is selected from a group consisting of monochloroisocyanuric acid, dichloroisocyanuric acid, trichloroisocyanuric acid, wherein said polymer or prepolymer is said urethane polymer or prepolymer, and combinations hereof, and wherein the volume of said plug is at least 70° percent of the volume of said hollow.

15. A tire having an exterior surface repair of the composition of claim 11 wherein said hollow exists in a reinforcement free portion of a tire.

16. A tire having an exterior surface repair of the composition of claim 14 wherein said hollow exists in a reinforcement free portion of a tire.

17. A tire having an exterior surface repair of the composition of claim 11 wherein a hollow extends into a reinforcement area of a tire and wherein a cured elastomer patch is located on the interior portion of said tire in the vicinity of said hollow.

18. A tire having an exterior surface repair of the composition of claim 14 wherein said hollow extends into a reinforcement area of a tire and wherein a cured elastomer patch is located on the interior portion of said tire in the vicinity of said hollow.

* * * * *

UNITED STATES PATENT AND TRADEMARK OFFICE
CERTIFICATE OF CORRECTION

PATENT NO. : 4,718,469
DATED : January 12, 1988
INVENTOR(S) : Koch et al.

It is certified that error appears in the above-identified patent and that said Letters Patent are hereby corrected as shown below:

Column 12 - Table

Tire No. 4 - Brand of Tire should read --36.00-- instead of "36.0"

Column 15, Line 30

"plastimizers" should read --plasticizers--

Column 17, Line 65

After "plug and then" please insert --poured into the tire hollow. The sides of the tire hollow--

Signed and Sealed this

Twenty-eighth Day of June, 1988

Attest:

DONALD J. QUIGG

*Attesting Officer*       *Commissioner of Patents and Trademarks*

UNITED STATES PATENT AND TRADEMARK OFFICE
CERTIFICATE OF CORRECTION

PATENT NO.   : 4,718,469

DATED        : January 12, 1988

INVENTOR(S)  : Russell W. Koch and Douglas D. Snyder

It is certified that error appears in the above-identified patent and that said Letters Patent is hereby corrected as shown below:

Title page:

In the "Related U.S. Application Data" correct the filing date of U.S. Serial No. 767,998 from "Apr. 21," to --August 21,--

Signed and Sealed this

Thirtieth Day of May, 1989

Attest:

DONALD J. QUIGG

*Attesting Officer*          *Commissioner of Patents and Trademarks*